US006421580B1

(12) United States Patent
Robrechts

(10) Patent No.: US 6,421,580 B1
(45) Date of Patent: Jul. 16, 2002

(54) DISTRIBUTING EQUIPMENT FOR PIECE GOODS

(75) Inventor: Jozef Robrechts, Rijkevorsel (BE)

(73) Assignee: New Distribution Systems N.V., Geel (BE)

( * ) Notice: Subject to any disclaimer, the term of this patent is extended or adjusted under 35 U.S.C. 154(b) by 0 days.

(21) Appl. No.: 09/446,244

(22) PCT Filed: Jun. 16, 1998

(86) PCT No.: PCT/BE98/00092

§ 371 (c)(1),
(2), (4) Date: Apr. 28, 2000

(87) PCT Pub. No.: WO98/58856

PCT Pub. Date: Dec. 30, 1998

(30) Foreign Application Priority Data

Jun. 19, 1997 (EP) ........................................ 97870090

(51) Int. Cl.$^{7}$ ........................................ G06F 7/00

(52) U.S. Cl. ........................................ 700/214; 414/273

(58) Field of Search ........................ 700/213, 214, 700/215, 218, 225, 245, 258, 259, 250, 253, 254; 414/268, 270, 273; 901/47

(56) References Cited

U.S. PATENT DOCUMENTS 4,007,843 A * 2/1977 Lubbers et al. ............ 214/16.4
4,903,815 A * 2/1990 Hirschfield et al. ......... 194/205
5,139,384 A * 8/1992 Tuttobene .................. 414/281
5,143,193 A * 9/1992 Geraci ...................... 194/212
5,277,540 A * 1/1994 Helms et al. ............... 414/751
5,323,327 A * 6/1994 Carmichael et al. ........ 364/478
5,362,197 A * 11/1994 Rigling ...................... 414/786
5,416,914 A * 5/1995 Korngiebel et al. ........ 395/425
5,426,581 A * 6/1995 Kishi et al. ............ 364/167.01
5,429,470 A * 7/1995 Nicol et al. ................. 414/331
5,478,183 A * 12/1995 Savigny ...................... 414/276
5,930,144 A * 7/1999 Kondo et al. .......... 364/478.02
6,005,734 A * 12/1999 Shimada et al. .............. 360/92
6,012,894 A * 1/2000 Watanabe et al. ........... 414/806
6,144,519 A * 11/2000 Hanaoka et al. .............. 360/92

* cited by examiner

*Primary Examiner*—Christopher P. Ellis
*Assistant Examiner*—Khoi H. Tran
(74) *Attorney, Agent, or Firm*—Browdy and Neimark

(57) ABSTRACT

Distributing equipment for piece goods composed of (a) an order device (1), (b) locations (3) where the available piece goods can be arranged in such a way that the same goods are contained at the same location (3), (c) a transporting arrangement including a robot (4) cooperating with the order device (1) for moving a specific piece good from the corresponding location (3) to a delivery window (6), (d) a distinctive mark (9) at each of the locations (3) which can be detected by a sensor (10) incorporated in the robot (4), the latter having a memory unit cooperating with the sensor (10) for storing the coordinates of the different marks (9), and a control arrangement for moving the robot (4) to a location (3) with a mark (9), identified by specific coordinates selected among the stored coordinates.

4 Claims, 3 Drawing Sheets

DISTRIBUTING EQUIPMENT FOR PIECE GOODS

The invention is relating to a distributing equipment for piece goods comprising (a) an order device, (b) locations where the available piece goods can be arranged in such a way that the same goods are contained at the same location, (c) transporting means including a robot cooperating with said order device for moving a specific piece good from the corresponding location to a delivery window, and (d) a distinctive mark at each of said locations which can be detected by a sensor incorporated in the robot.

First of all, by the expression "piece good" it has to be understood, in the present specification, all kinds of products which are packed as one piece, such as bottles, boxes, bags, etc . . . , of which the dimensions are not too important, f.i. with a side length or a height of maximum 30 cm., so that they can be arranged very easy in the above locations.

One of the aims of the invention is to propose means which enable to control, on a very easy and accurate way, the moving of the robot to a preselected location of piece goods in a distribution equipment, as defined hereinabove.

According to the invention, said equipment comprises a memory unit cooperating with said sensor for storing the coordinates of said different marks and control means for moving the robot to a location with a mark, identified by specific coordinates selected among the stored coordinates.

In some cases, the place of a mark can change by inadvertence, f.i. when replacing or loading the location with goods or when taking off selected goods for moving them to the delivery window, so that if the coordinates of the new location have not been introduced in the memory unit of the robot the latter will not be able to stop at the right place when piece goods are selected from this altered location.

This problem has also been solved, according to the invention, as, in a preferred embodiment of the invention, the distributing equipment comprises means for rectifying the position of the robot when said sensor cannot detect the mark at the specific location corresponding with the selected stored coordinates by submitting the robot, from the place indicated by the selected coordinates, to a back and forth motion with an increasing amplitude according to its direction of movement until said sensor detects the most closely mark and means for storing the coordinates of this mark in replacement of the preceding mark, so that, for the next order of the same goods, the robot will automatically be brought in front of the location corresponding to this newly detected mark.

Other details and features of the invention will become apparent from the description given hereinbelow, by way of non-limiting example, of a particular embodiment of the distributing equipment according to the invention.

Figure 1:
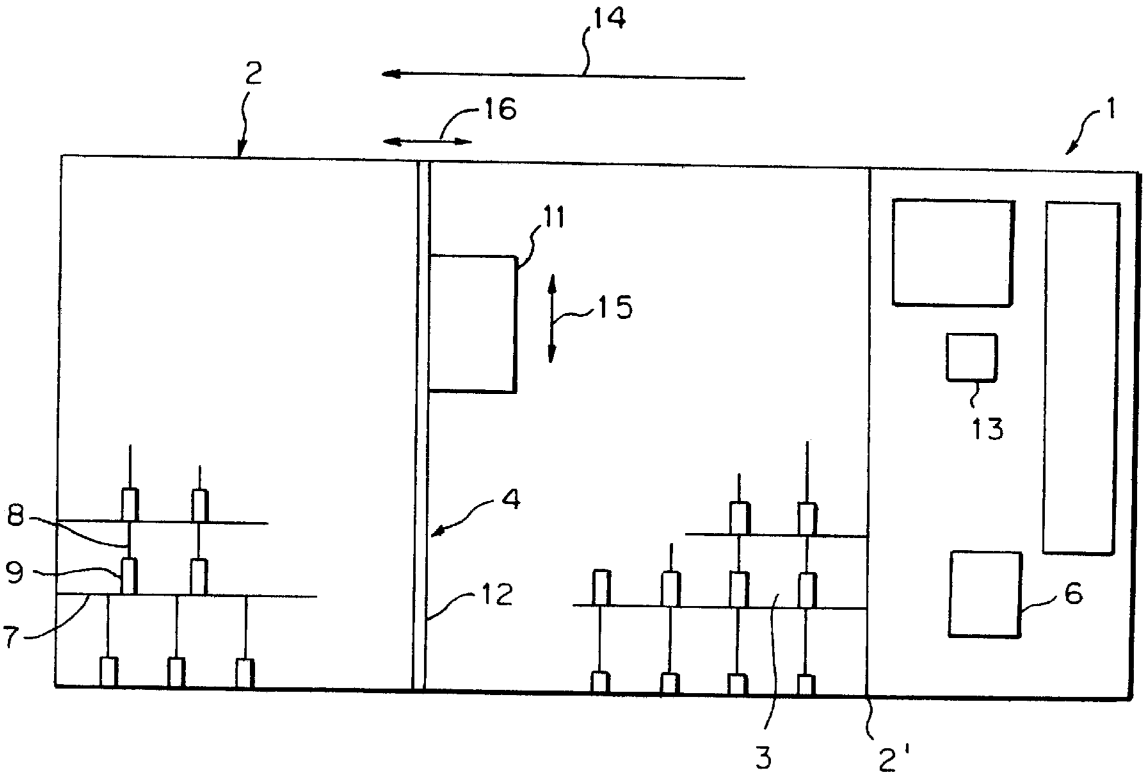
FIG. 1 is a schematic representation of a front view with a partial section of a distributing equipment according to this particular embodiment.

The invention is relating to a distributing equipment for piece goods comprising an order device 1 and a showcase 2 wherein the available goods are exhibited and arranged at specific locations which are in the present cases, formed by compartments 3, which can be separated from each other by partitions 8, or not, and transporting means formed by a robot 4 for moving a specific piece of good from the corresponding compartment 3 to a delivery window 6.

As can further be seen in FIG. 1, these compartments extend in superimposed rows or shelves 7. Each shelves 7 is identified by a reference number, while the different compartments of the same row can be identified by the corresponding row number followed by a compartment reference number of this specific row.

For example, the reference "01.03" is relating to the third compartment of the first row. Of course, in stead of a number it is possible to use another reference sign, such as a letter of the alphabet or a schematical design of the kind of good of the specific row.

Figure 2:
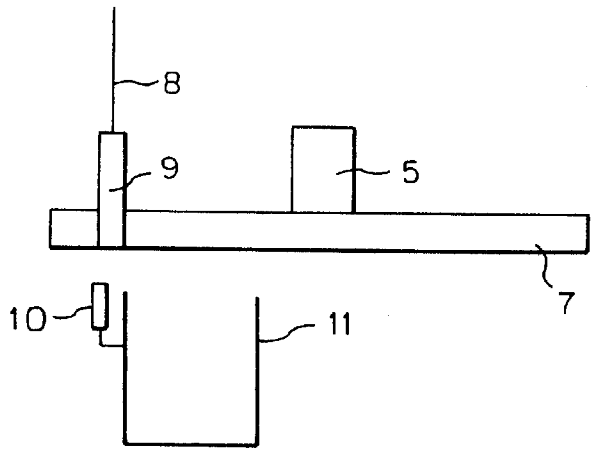
FIG. 2 is, on a larger scale, a schematic representation of a front view of a detail of the embodiment of FIG. 1.

The above mentioned references form distinctive marks which are indicated on a label 9, provided on the different partitions 8, as shown in FIG. 2.

According to the invention, the robot 4 comprises a memory unit, not represented on the figures, but which can be included in the order device 1 or in a computer, also not represented in the figures. The memory unit cooperates with a sensor 10 mounted on a hamper 11 of the robot 4, said hamper 11 enabling to collect goods from the different compartments 3.

The robot 4 has a vertical rail 12 which can move horizontally in the showcase 2 along the compartments 3, while the hamper 11 can move up and down along said rail 12.

When starting the distributing equipment, the sensor 10 of the robot 4 is moving successively along the different shelves 7 for scanning the labels 9 which are provided at each compartment 3. At each time, when a label is detected, the coordinates thereof will be stored in the memory unit of the robot 4.

The coordinates are f.i. formed by the horizontal and vertical distances X, Y from the lower right corner 2' of the show case 2.

When a user orders a specific piece good 5 he has to introduce in an input unit 13 of the order device the corresponding references appearing on the label 9 at the compartment 3 where this piece good 5 is available. These references correspond to coordinates which have been stored in the memory unit of the robot 4. As a result, the robot 4 is moving horizontally, vertically or diagonally directly to the compartment 3 identified by these references.

According to the invention, thanks to the fact that said coordinates have been stored in a memory unit of the robot 4, the latter is moving according to the direction of arrow 14 from his start position at the right side of the showcase 2, while, simultaneously, the hamper 11 undergoes a displacement along the rail 12 directly to the compartment with the label 9 having said coordinates, which will be detected by the sensor 10.

There is an important difference with respect to the known distributing equipment, wherein the hamper 11 of the robot 4 first ondergoes a vertical movement along the rail 12 untill the level of the shelf 7 of the designated compartment 3 and only after the hamper 11 has reached this shelf 7 the robot 4 is submitted to a horizontal movement according to arrow 14 until said designated compartment.

Another advantage of storing the coordinates of the label in a memory unit is that the compartments have not necessarily to have the same size and to be arranged in rows and columns.

When the hamper 11 reaches the place in the show case 2 having the selected coordinates, the robot 4 is stopped and, by means of the sensor 10, the corresponding label 9 is detected and the references thereof registered and compared with the selected coordinates.

When the references of the label 9 correspond with the selected coordinates, a piece good 5 from the compartment 3, designated by this label 9, is transported by the hamper 11 of the robot 4 to the delivery window 6.

However, when no label or a wrong label is detected by the sensor 10, according to the invention, means have been provided for rectifying the position of the robot 4 by submitting the latter to a back and forth motion, as indicated by arrows 16 on FIG. 1, with an increasing amplitude along the compartments 4 untill the sensor 10 detects the most closely label.

At that moment, the coordinates of this label are stored in the memory unit in replacement of these of the preceding place of the label.

Consequently, for the next order of the same goods, the hamper 11 of the robot will automatically be brought in front of the compartment designated by these newly stored coordinates.

Advantageously, control means are provided for moving the robot back and forth according to constant successive discrete steps of a length equal or shorter than the width of a label 9, and to inverse the moving direction after each new further step in a specific direction, so as to be able to check successively at both sides of the place with the selected coordinates the possible positions of the label having the references introduced in the input unit.

Also the number of steps in one direction has to be smaller than the ratio of the distance between two successive labels and the length of one single step, so as to avoid to detect the label of the adjacent compartment. Moreover, the steps should also not be too short to avoid inertia problems of the robot which could result in a less accurate detection.

Figure 3:
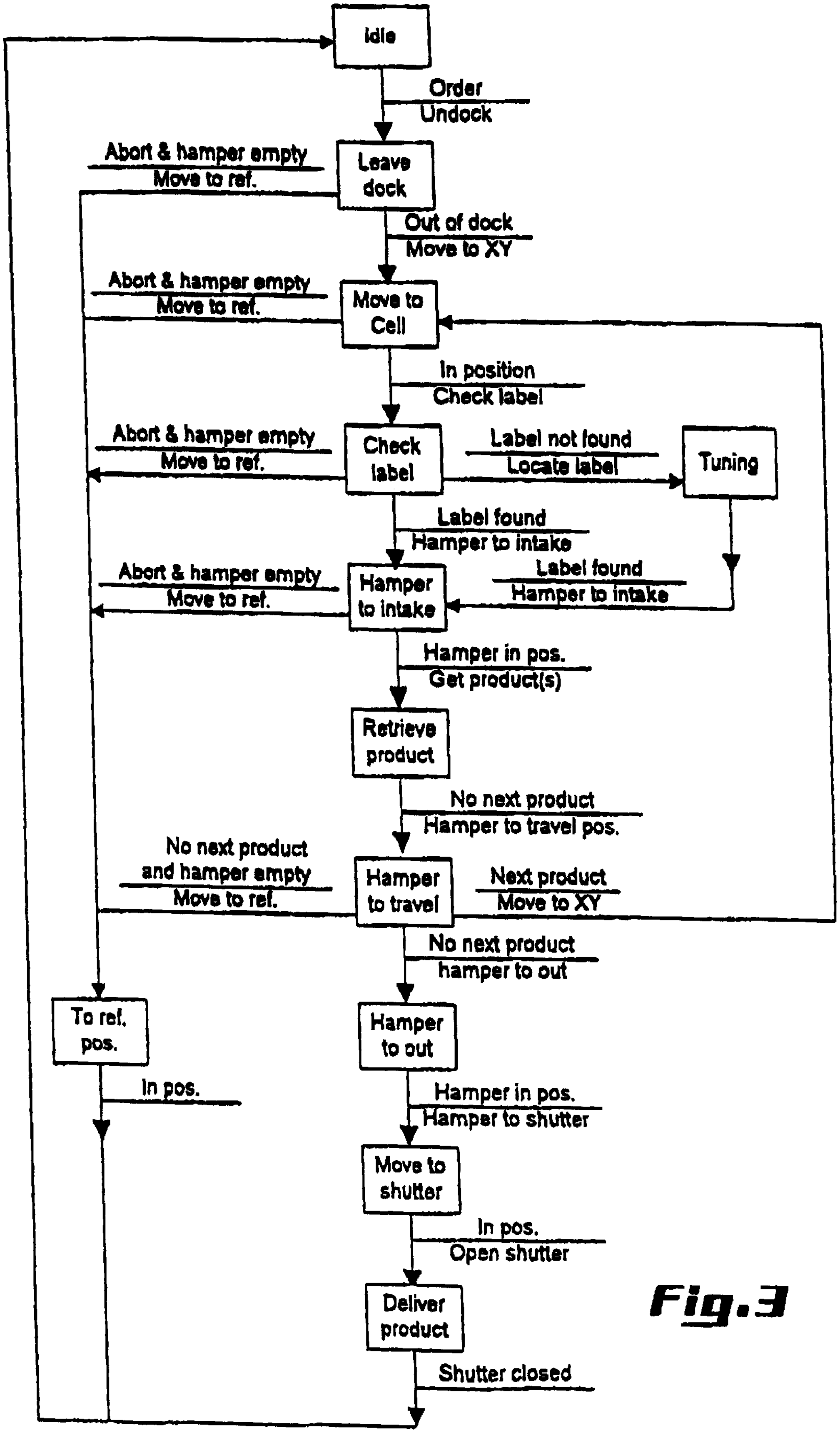
FIG. 3 is a block diagram showing schematically different operation steps of the distributing equipment according to the invention.

FIG. 3 is a flow sheet of the general operating cycles of the distributing equipment, more particularly for taking up selected piece goods from the compartments and transporting same to the delivery window 6 by means of a robot 4 provided with a hamper 11.

The reference position of the robot corresponds to the position at the delivery window wherein the hamper 11 is in out-take position.

Figure 4:
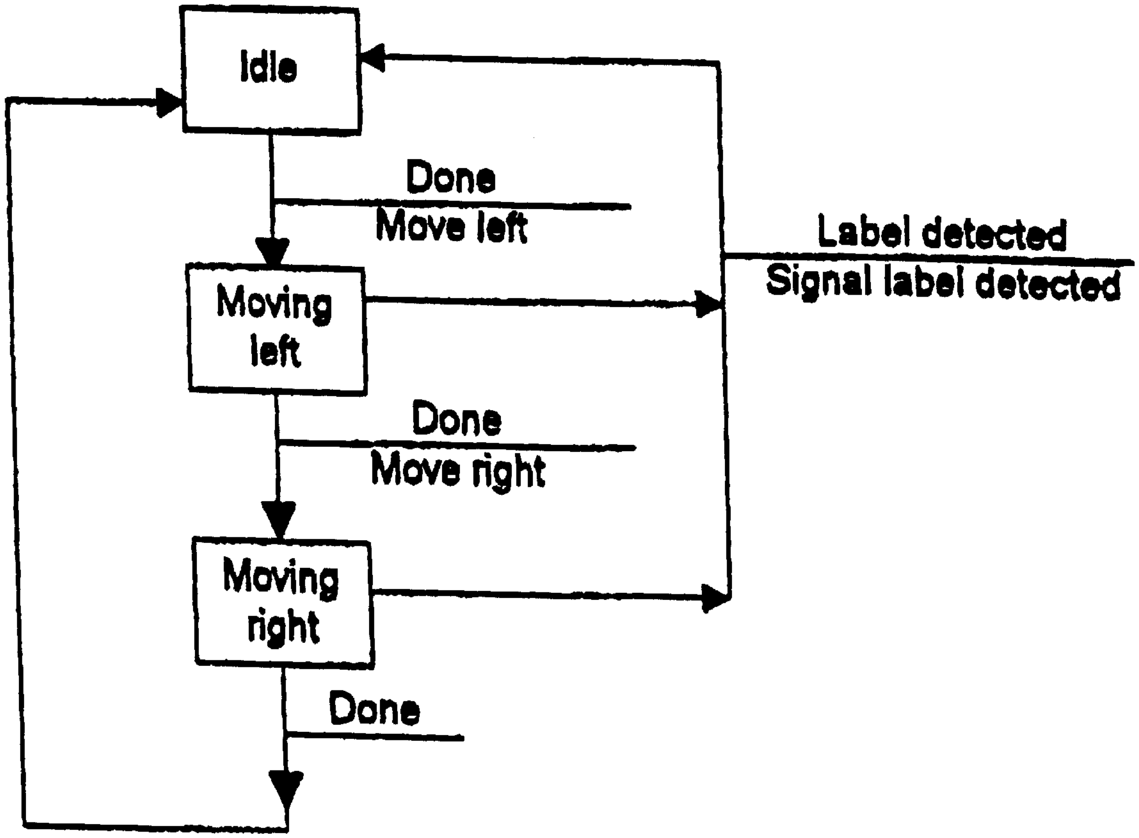
FIG. 4 is a more detailled block diagram of a part of the above block diagram.

FIG. 4 is a detailled flow-sheet of the tuning operations, as indicated in FIG. 3 for self correcting the position of the robot if the sensor 10 does not detect the label having the coordinates selected in the memory unit of the robot, as described hereinabove.

What is claimed is:

1. Distributing equipment for piece goods comprising:

(a) an order device (1);

(b) locations (3) where available piece goods can be arranged in such a way that the same goods are contained at the same location (3);

(c) a delivery window (6);

(d) transporting means including a robot (4) cooperating with said order device (1) for moving a specific piece goods from the corresponding location (3) to said delivery window (6), said robot having a sensor (10); and (e) a distinctive mark (9) at each of said locations (3) which can be detected by said sensor (10);

(f) wherein said robot (4) comprises a memory unit cooperating with said sensor (10) for storing the coordinates of said distinctive marks (9), and control means for moving said robot (4) horizontally, vertically and diagonally directly to a location (3) with a mark (9), identified by specific coordinates selected among the stored coordinates.

2. Distributing equipment according to claim 1, further comprising means for moving the robot (4) back and forth according to successive discrete steps of a length equal to or smaller than the width of one of said marks.

3. Distributing equipment for piece goods comprising:

(a) an order device (1);

(b) locations (3) where available piece goods can be arranged in such a way that the same goods are contained at the same location (3);

(c) a delivery window (6);

(d) transporting means including a robot (4) cooperating with said order device (1) for moving a specific piece goods from the corresponding location (3) to said delivery window (6), said robot having a sensor (10);

(e) a distinctive mark (9) at each of said locations (3) which can be detected by said sensor (10);

(f) a memory unit associated with said robot (4) and cooperating with said sensor (10) for storing the coordinates of said distinctive marks (9);

(g) control means for moving said robot (4) to a location (3) with a selected one of the distinctive marks (9), identified by specific coordinates selected among the stored coordinates;

(h) means for rectifying the position of the robot (4) when said sensor (10) cannot detect the selected one of the distinctive marks (9) at the specific location (3), corresponding with the selected stored coordinates by subjecting the robot (4), from the place indicated by the selected coordinates, to a back and forth motion with an increasing amplitude according to its direction of movement until said sensor (10) detects the location of one of the distinctive marks (9) that is closest to the specific location (3), corresponding with the selected currently stored coordinates; and (i) means for storing the coordinates of the detected location of the one of the distinctive marks (9) in replacement of the previously stored coordinates of the selected one of the distinctive marks (9), so that, for the next order of the same goods, the robot (4) will automatically be brought in front of the detected location of the one of the distinctive marks (9).

4. Distributing equipment according to claim 3, further comprising means for moving the robot (4) back and forth according to successive discrete steps of a length equal to or smaller than the width of one of said marks.

* * * * *